Dec. 26, 1950   P. RAWL ET AL   2,535,601
ATTACHMENT FOR SNAP-ON SNOW CHAINS
Filed Aug. 30, 1948   2 Sheets-Sheet 1

Philip Rawl
Sumner Rosoff
INVENTORS

BY Clarence A. O'Brien
and Harvey B. Jacobson
Attorneys

Dec. 26, 1950 P. RAWL ET AL 2,535,601
ATTACHMENT FOR SNAP-ON SNOW CHAINS
Filed Aug. 30, 1948 2 Sheets-Sheet 2
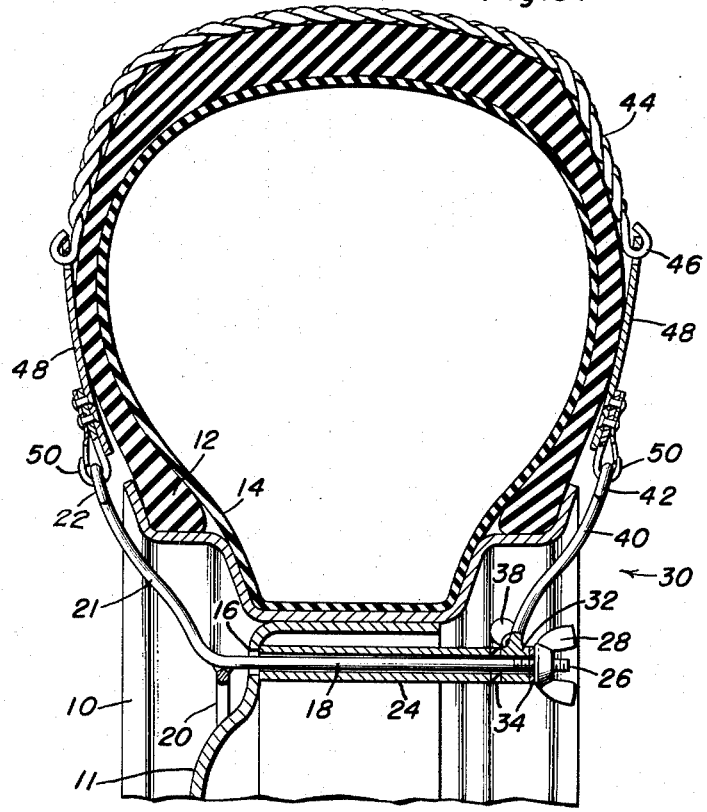
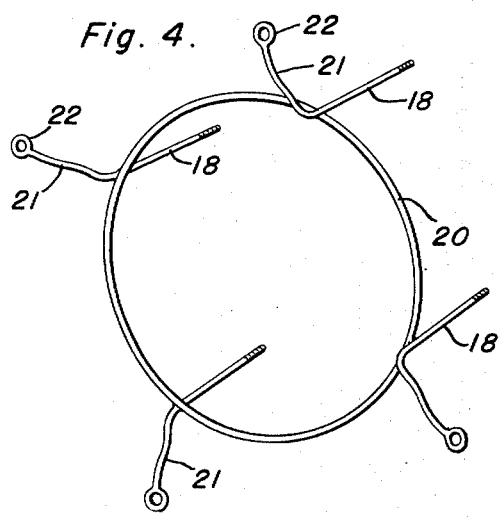
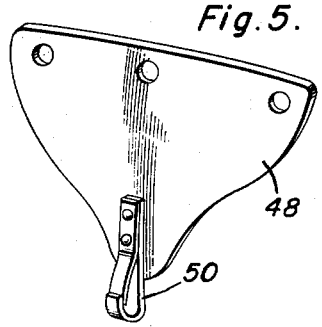
Philip Rawl
Sumner Rosoff
INVENTORS Patented Dec. 26, 1950

2,535,601

UNITED STATES PATENT OFFICE 2,535,601

ATTACHMENT FOR SNAP-ON SNOW CHAINS

Philip Rawl, Brookline, and Sumner Rosoff, Dorchester, Mass.

Application August 30, 1948, Serial No. 46,846

4 Claims. (Cl. 152—242)

This invention relates generally to tire chains, and more particularly to a system of attachment for individual tire chains of the type which are circumferentially spaced around the tire on an automotive vehicle.

In brief, this invention includes a plurality of bars extending through apertures in the tire rim, together with rim engaging arms carried by one end portion of each bar and a spider also having rim engaging arms removably securable to the other end portion of each bar, the bars and spiders having rim-spanning arms with eyes on their outer ends for securement to the tire chains. The rim-engaging arms locate the bars with reference to the rim, with or without the assistance of a rigid hoop which may be added to the other elements of this invention.

A primary object of this invention is to facilitate the mounting of individual tire chains on the wheel of an automotive vehicle, and the removal of these chains when no longer required.

Another object of this invention is to provide tire attachment means which may be used for securing individual transversely disposed tire chains quickly and easily and in such a manner that the chains and attachment means therefor will not rattle during the operation of the vehicle.

Still another object of this invention is to provide means of the character mentioned above which, in particular reference to one embodiment of this invention, can be applied to rims of several different sizes and configurations.

And a last object to be mentioned specifically is to provide means of this character which is relatively inexpensive and practicable to manufacture, which is adapted to preserve the tire chains in proper orientation upon the tire, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 3 is a vertical transverse sectional view, taken substantially upon the line 3—3 in Figure 1;

Figure 4 is a three dimensional view of the parts which are hereinafter referred to as the hoop, bars and rim-spanning arms;

Figure 5 is a three dimensional view of the attachment plate for the direct attachment of the tire chains, when three such chains are mounted together, as illustrated in each of the corresponding units in Figures 1 and 2;

Similar characters of reference designate similar or identical elements and portions throughout the specification and throughout the different views in the drawings.

Figure 1:
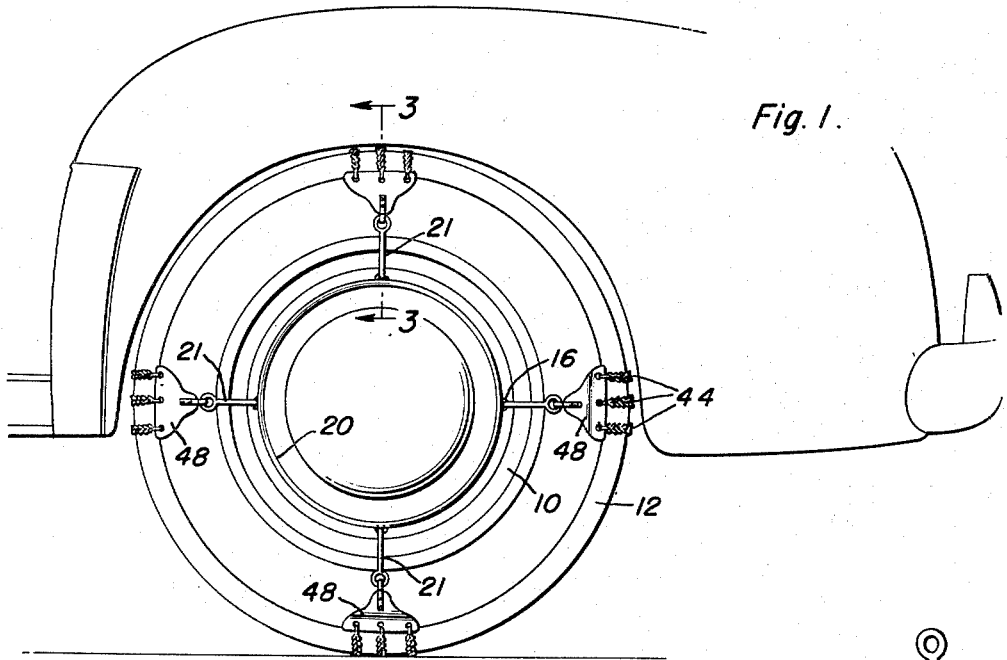
Figure 1 is a fragmentary elevational view of the rear end of an automobile with this invention operatively applied to the rear wheel and tire.
Figure 2:
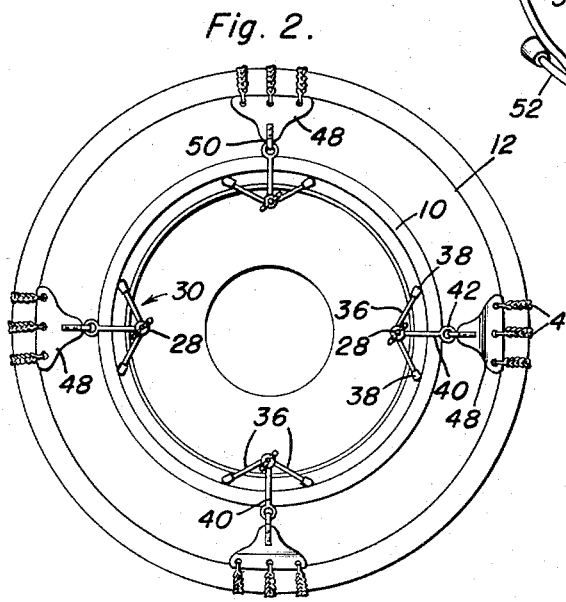
Figure 2 is an elevational view of the inside of the same wheel with this invention applied thereon.

Referring now to the drawings in detail, the environment wherewith this invention is adapted to be used will ordinarily include a rim 10 adapted to carry a tire 12, a wheel 11, and inner tube 14, and the wheel 11 will be ordinarily provided with apertures 16. In some instances these apertures may have to be enlarged slightly to accommodate the bars 18 provided in the instant invention.

Figure 6:
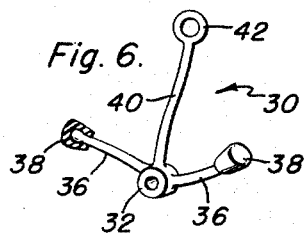
Figure 6 is a three dimensional view of a spider.

A plurality of these bars 18 extend transversely of the rim 10 and, in the preferred embodiment of this invention, will be integrally secured to a hoop 20, the bars and hoop being both of substantially rigid material. Each of the bars 18 is continued outwardly and radially to comprise rim-spanning arms 21 which terminate in eyes 22. A sleeve 24 is provided for each of the bars 18, and when these bars have been inserted through the apertures 16, the sleeves 24 extend to the opposite side of the rim 10. The ends 26 of the bars 18 are threaded to receive wing nuts 28 and spiders, generally indicated by the numeral 30 and represented best in Figure 6, include socket portions 32 which fit over the threaded portions 26 of the bars 18 and abut the ends of the sleeves 24, a complement of washers 34 being provided, as desired.

Each of the spiders 30 includes rim-engaging arms 36 which are integral with the socket portions 32 and which may be provided with resilient buttons 38 on their outer ends to prevent damage to the finish of the rims 10. Each spider also includes a rim-spanning arm 40 terminating in an eye 42.

The actual tire chains used in this invention may vary considerably in form, that embodiment illustrated including three chains 44 arranged in parallel relation and permanently secured, as at 46, to attachment plates 48. These attachment plates will be provided with a snap hook 50, or analogous structure, whereby the chains may be secured to the eyes 22 and 42.

Figure 7:
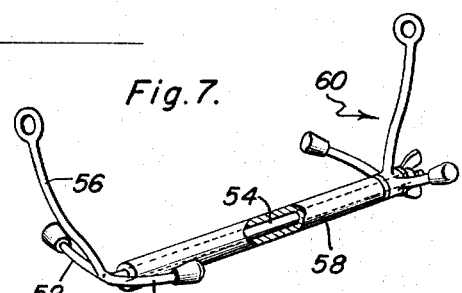
Figure 7 is a three dimensional view of a slightly modified form of this invention in which the hoop is deleted.

In the embodiment of this invention, illustrated in Figure 7, the hoop 20 is deleted, and a pair of rim-engaging arms 52 will be provided for each transversely extending bar 54 which corresponds exactly with the bar 18 already described. A rim-spanning arm 56, a sleeve 58, and a spider 60 will be formed according to the corresponding units already described.

The operation of this invention will be clearly understood from the foregoing description of the mechanical details thereof, taken in connection with the drawings and with the description of the objects sought to be achieved by this invention. Further description would, therefore, appear unnecessary.

Minor variations may be resorted to without departure from the scope of this invention, which scope should be determined only as directed by a proper interpretation of the subjoined claims.

Having described the invention, what is claimed as new is:

1. The combination of tire chains, a plate secured to each end of said chains, a wheel with transverse apertures therein, sleeves extending through said apertures, bars of greater length than and extending through said sleeves, spiders on the ends of the bars on one side of said rim, rim-engaging members on each bar on the ends of the bars on the other side of said rim, oppositely disposed rim-spanning arms having eye terminals and carried by one end portion of each bar and by said spiders, said hooks securing said plates to said eye terminals.

2. The combination of tire chains, a plate secured to each end of said chains, a tire wheel with transverse apertures therein, sleeves extending through said apertures, bars of greater length than and extending through said sleeves, spiders on the ends of the bars on one side of said rim, rim-engaging members on each bar on the ends of the bars on the other side of said rim, oppositely disposed rim-spanning arms having eye terminals and carried by one end portion of each bar and by said spiders, said hooks securing said plates to said eye terminals, one of said rim-engaging members comprising a hoop secured to the ends of the bars on said one side of the tire rim to function as auxiliary means in locating said bars.

3. The combination of tire chains, a plate secured to each end of said chains, a wheel with transverse apertures therein, sleeves extending through said apertures, bars of greater length than and extending through said sleeves, spiders on the ends of the bars on one side of said rim, rim-engaging members on each bar on the ends of the bars on the other side of said rim, oppositely disposed rim-spanning arms having eye terminals and carried by one end portion of each bar and by said spiders, said hooks securing said plates to said eye terminals, one of said rim-engaging members comprising a hoop secured to the ends of the bars on said one side of the tire rim to function as auxiliary means in locating said bars, said spiders having sockets fitting over said end portions of said bars and abutting one end of each of said sleeves, said end portions being threaded, and nuts to hold said sockets in place.

4. The combination of tire chains, a plate secured to each end of said chains, a wheel with transverse apertures therein, sleeves extending through said apertures, bars of greater length than and extending through said sleeves, spiders on the ends of the bars on one side of said rim, rim-engaging members on each bar on the ends of the bars on the other side of said rim, oppositely disposed rim-spanning arms having eye terminals and carried by one end portion of each bar and by said spiders, said hooks securing said plates to said eye terminals, one of said rim-engaging members comprising a hoop secured to the ends of the bars on said one side of the tire rim to function as auxiliary means in locating said bars, said spiders having sockets fitting over said end portions of said bars and abutting one end of each of said sleeves, said end portions being threaded, and nuts to hold said sockets in place, said rim-spanning arms on one side of the rim being carried on said spiders.

PHILIP RAWL.
SUMNER ROSOFF.

REFERENCES CITED

The following references are of record in the file of this patent:

UNITED STATES PATENTS

| Number | Name | Date |
|---|---|---|
| 1,450,779 | LaRiviere | Apr. 3, 1923 |
| 2,420,804 | Wenzel | May 20, 1947 |